(12) United States Patent
Huang et al.

(10) Patent No.: US 11,940,412 B2
(45) Date of Patent: *Mar. 26, 2024

(54) BIOSENSOR

(71) Applicant: Taiwan Semiconductor Manufacturing Company, Ltd., Hsinchu (TW)

(72) Inventors: Yu-Jie Huang, Kaohsiung (TW); Jui-Cheng Huang, Hsinchu (TW); Yi-Hsing Hsiao, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,573

(22) Filed: Aug. 9, 2022

(65) Prior Publication Data

US 2022/0381733 A1 Dec. 1, 2022

Related U.S. Application Data

(62) Division of application No. 17/172,161, filed on Feb. 10, 2021, now Pat. No. 11,686,704.

(51) Int. Cl.
| G01N 27/447 | (2006.01) |
| B03C 5/00 | (2006.01) |
| G01N 27/414 | (2006.01) |

(52) U.S. Cl.
CPC ....... *G01N 27/44782* (2013.01); *B03C 5/005* (2013.01); *G01N 27/4145* (2013.01); *G01N 27/44704* (2013.01)

(58) Field of Classification Search
CPC ......... G01N 27/44782; G01N 27/4145; G01N 27/44704; B03C 5/005; B03C 5/026; B03C 2201/26
See application file for complete search history.

(56) References Cited

U.S. PATENT DOCUMENTS

| 8,728,844 B1 | 5/2014 | Liu et al. |
| 9,080,969 B2 | 7/2015 | Liu et al. |
| 9,395,326 B2 | 7/2016 | Chen et al. |
| 9,498,784 B2 | 11/2016 | Cheng et al. |

(Continued)

FOREIGN PATENT DOCUMENTS

| CN | 104614430 A | 5/2015 |
| CN | 110954585 A | 4/2020 |

(Continued)

OTHER PUBLICATIONS

Zhang et al., Dielectrophoresis for manipulation of micro/nano particles in microfluidic systems, Anal. Bioanal. Chem. 2010, 396: 401-420 (Year: 2010).*

(Continued)

*Primary Examiner* — Joshua L Allen
*Assistant Examiner* — Shizhi Qian
(74) *Attorney, Agent, or Firm* — MERCHANT & GOULD P.C.

(57) ABSTRACT

A biosensor system includes an array of biosensors with a plurality of electrodes situated proximate the biosensor. A controller is configured to selectively energize the plurality of electrodes to generate a DEP force to selectively position a test sample relative to the array of biosensors.

20 Claims, 10 Drawing Sheets

(56) References Cited

U.S. PATENT DOCUMENTS

| | | | |
|---|---|---|---|
| 10,101,295 B2 | 10/2018 | Chang et al. | |
| 2003/0047456 A1* | 3/2003 | Medoro | B03C 5/026 |
| | | | 204/547 |
| 2013/0200438 A1 | 8/2013 | Liu et al. | |
| 2014/0151755 A1* | 6/2014 | Liu | H01L 29/66477 |
| | | | 438/48 |
| 2015/0125872 A1 | 5/2015 | Chen et al. | |
| 2015/0168333 A1 | 6/2015 | Wu | |
| 2016/0334362 A1* | 11/2016 | Liu | H01L 27/085 |
| 2017/0205371 A1 | 7/2017 | Liu et al. | |
| 2018/0195998 A1* | 7/2018 | Kalnitsky | G01N 27/4145 |
| 2019/0041357 A1 | 2/2019 | Hwang et al. | |

FOREIGN PATENT DOCUMENTS

| | | |
|---|---|---|
| JP | 2020-46284 A | 3/2020 |
| TW | 201413230 A | 4/2014 |
| TW | 201423101 A | 6/2014 |
| TW | 201522959 A | 6/2015 |

OTHER PUBLICATIONS

Agilent 33250A User's Guide. (Year: 2003).

Castellarnau et al., Integrated microanalytical system based on electrochemical detection and cell positioning, Materials Science and Engineering C, 26, 2006, 405-410 (Year: 2006).

Ibrahim et al. The octupole microelectrode for dielectrophoretic trapping of single cells design and simulation, IEEE-ICSE2012 Proc., 2012, Kuala Lumpur, Malaysia (Year: 2012).

Lee et al. Ion-sensitive field-effect transistor for biological sensing, Sensors, 2009, 9, 7111-7131 (Year: 2009).

Liang et al. Determination of dielectric properties of cells using AC electrokinetic-based microfluidic platform: a review of recent advances, Micromachines, 2020, 11, 513 (Year: 2020).

Reichle et al. Electro-rotation in octopole micro cages, J. Phys. D: Appl. Phys. 32 (1999) 2128-2135 (Year: 1999).

\* cited by examiner

BIOSENSOR

CROSS-REFERENCE TO RELATED APPLICATIONS

This application is a division of U.S. application Ser. No. 17/172,161, filed Feb. 10, 2021, and titled "BIOSENSOR," the disclosure of which is hereby incorporated herein by reference.

BACKGROUND

Biosensors refer to devices for sensing and detecting biomolecules and operate on the basis of electronic, electrochemical, optical, and mechanical detection principles. Biosensors that include transistors are sensors that electrically sense charges, photons, and mechanical properties of bio-entities or biomolecules. The detection can be performed by detecting the bio-entities or biomolecules themselves, or through interaction and reaction between specified reactants and bio-entities/biomolecules. Such biosensors can be manufactured using semiconductor processes, can quickly convert electric signals, and can be easily applied to integrated circuits (ICs) and microelectromechanical systems (MEMS).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
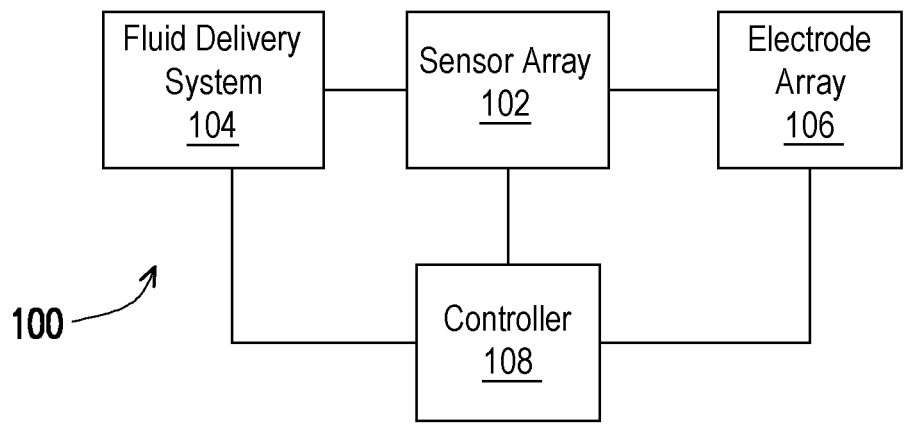
FIG. 1 is a block diagram illustrating aspects of an example biosensor system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, as used herein a "biosensor" refers an analytical device used for the detection of a chemical substance that combines a biological component with a physicochemical detector. Such biological components may include, for example, cells, groups of cells, tissue, microorganisms, organelles, cell receptors, enzymes, antibodies, nucleic acids, etc. Such biologically derived materials or biomimetic components interacts with, binds with, or recognize the analyte under study.

The term "bioFET" as used herein refers to a field-effect sensor with a semiconductor transducer, and more particularly to a field-effect transistor (FET) based biosensor. In a bioFET, the gate of a metal-oxide-semiconductor field-effect transistor (MOSFET), which controls the conductance of the semiconductor between its source and drain contacts, is replaced by a bio- or biochemical-compatible layer or a biofunctionalized layer of immobilized probe molecules that act as surface receptors. Essentially, a bioFET is a field-effect biosensor with a semiconductor transducer. A decided advantage of bioFETs is the prospect of label-free operation. Specifically, bioFETs enable the avoidance of costly and time-consuming labeling operations such as the labeling of an analyte with, for instance, fluorescent or radioactive probes.

A typical detection mechanism for bioFETs is the conductance modulation of a transducer due to the binding of a target biomolecule or bio-entity to a sensing surface or a receptor molecule immobilized on the sensing surface of the bioFET. When the target biomolecule or bio-entity is bonded to the sensing surface or the immobilized receptor, the drain current of the bioFET is varied by the potential from the sensing surface. This change in the drain current can be measured and the bonding of the receptor and the target biomolecule or bio-entity can be identified. A great variety of biomolecules and bio-entities may be used to functionalize the sensing surface of the bioFET such as ions, enzymes, antibodies, ligands, receptors, peptides, oligonucleotides, cells of organs, organisms and pieces of tissue. For instance, to detect ssDNA (single-stranded deoxyribonucleic acid), the sensing surface of the bioFET may be functionalized with immobilized complementary ssDNA strands. Also, to detect various proteins such as tumor markers, the sensing surface of the bioFET may be functionalized with monoclonal antibodies.

Biosensors are typically used for two-dimensional (2D) analysis of a test sample, such as a cell culture. However, three-dimensional (3D) cell analysis is desirable to obtain additional information regarding the test sample. As compared to typical 2D cell cultures, 3D cell analysis may provide more relevant information. For instance, an array of 2D electrodes or image sensors may be used to monitor a 3D cell. However, such arrangements only get partial information from sub-cells that actually contact the 2D biosensor surface. It may be difficult to get an accurate behavioral profile of a whole 3D cell based on this incomplete information.

In accordance with aspects of the present disclosure, 3D cells to be analyzed are manipulated on a semiconductor biosensor platform using techniques such as dielectrophoresis (DEP) to analyze the entire 3D cell. Such DEP techniques, for example, may be configured to trap, lift, and rotate 3D cells for monitoring and analysis with a semiconductor biosensor platform. In general, DEP refers to a phenomenon wherein a force is exerted on a dielectric particle when it is subjected to a non-uniform electric field. This force does not require the particle to be charged. Manipulation of cells using DEP in embodiments disclosed herein provides a methodology to achieve 3D electrical cell detection using a 2D sensor.

FIG. 1 is a block diagram of an example biosensor system 100 in accordance with the disclosure. As shown in FIG. 1, the example biosensor system 100 may include, among other things, a sensor array 102, a fluid delivery system 104, an electrode array 106 and a controller 108. The sensor array 102 may have at least one sensing element for detecting a biological or chemical analyte.

Figure 2:
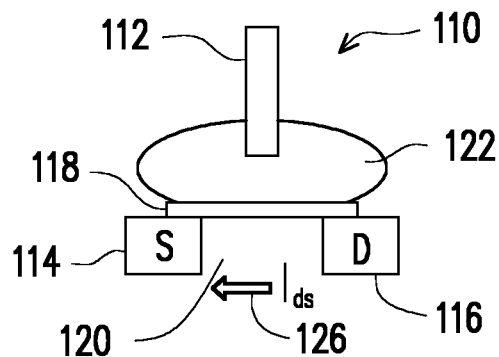
FIG. 2 is a block diagram schematically illustrating an example of a bioFET in accordance with some embodiments.

The sensor array 102 may include an array of bioFETs 110, an example of which is illustrated in FIG. 2. The bioFET 110 shown in FIG. 2 may be functionalized to detect a particular target analyte, and different ones of the sensors may be functionalized using different capture reagents for detecting different target analytes. The bioFETs may be arranged in a plurality of rows and columns, forming a 2-dimensional array of sensors. In some embodiments, each row of bioFETs is functionalized using a different capture reagent. In some embodiments, each column of bioFETs is functionalized using a different capture reagent.

The fluid delivery system 104 may deliver one or more fluid samples to the sensor array 102. The fluid delivery system 104 may be a microfluidic well positioned above the sensor array 102 to contain a fluid over the sensor array 102. The fluid delivery system 104 may also include microfluidic channels for delivering various fluids to the sensor array 102. The fluid delivery system 104 may include any number of valves, pumps, chambers, channels designed to deliver fluid to the sensor array 102. The electrode array 106 may include a plurality of electrodes configured to manipulate a sample to be analyzed by the sensor array, such as cells.

The controller 108 may send and receive electrical signals to both the sensor array 102 and the electrode array 106 to position the sample as desired to perform bio- or chemical-sensing measurements. The controller 108 may also send electrical signals to the fluid delivery system 104 to, for example, actuate one or more valves, pumps, or motors. The controller 108 may include one or more processing devices, such as a microprocessor, and may be programmable to control the operation of the electrode array 106, the sensor array 102 and/or the fluid delivery system 104. Examples of various electrical signals that may be sent and received from sensor array 102 will be discussed in more detail below.

The example bioFET 110 may include, among other things, a vertical fluid gate (VFG) 112, a source region 114, a drain region 116, a sensing film 118, and a channel region 120. The fluid delivery system 104 applies a fluid 122 over the sensing film 118. The fluid 122 may contain analyte. The sensing film 118 may be an electrically and chemically insulating layer that separates the fluid 122 from the channel region 120. The sensing film 118 may include, among other things, a layer of a capture reagent. The capture reagent is specific to an analyte and capable of binding the target analyte or target reagent. Upon binding of the analyte, changes in the electrostatic potential at the surface of the sensing film 118 occur, which in turn results in an electrostatic gating effect of the bioFET 110, and a measurable change in a current between the source and drain electrodes (e.g., an Ids current 126). A voltage applied to the vertical fluid gate 112 may also change the Ids 126. In other words, the output signal of the bioFET 110 is the Ids 126 which has a relationship with the voltage applied to the vertical fluid gate 112. In one embodiment, the bioFET may be a dual-gate back-side FET sensor, though other types of bioFETs are within the scope of the disclosure.

Figure 3:
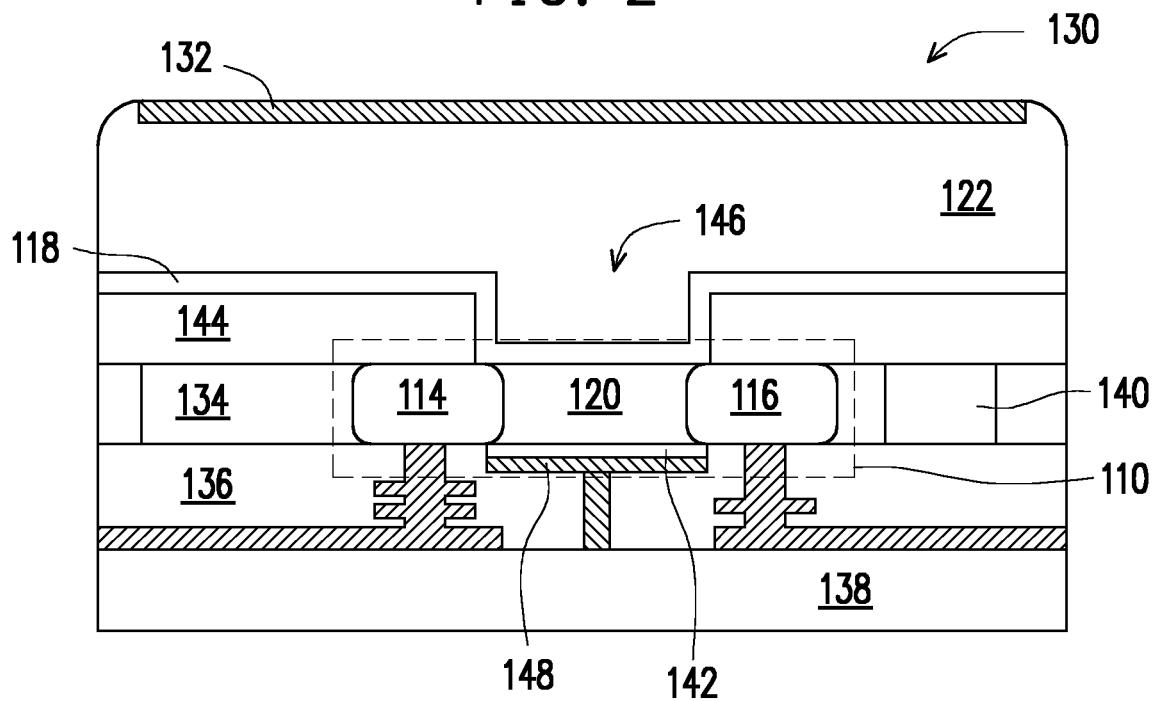
FIG. 3 is a sectional side view illustrating aspects of a backside sensing bioFET device in accordance with some embodiments.

FIG. 3 illustrates a backside sensing bioFET device 130 in accordance with some disclosed embodiments. A back-end-of-line (BEOL) interconnect structure 136 is arranged over a handling substrate 138 and a device substrate 134 is arranged over the BEOL interconnect structure 136. A reference electrode 132 is arranged over the device substrate 134. The handling substrate 138 may be, for example, a bulk semiconductor substrate, such as a bulk substrate of monocrystalline silicon.

The interconnect structure 136 may include a multi-layer interconnect (MLI) structure having conductive lines, conductive vertical interconnect accesses (vias), and/or interposing dielectric layers (e.g., interlayer dielectric (ILD) layers). The interconnect structure 136 may provide various physical and electrical connections to the bioFET 110. The conductive lines may comprise copper, aluminum, tungsten, tantalum, titanium, nickel, cobalt, metal silicide, metal nitride, poly silicon, combinations thereof, and/or other materials possibly including one or more layers or linings. The interposing dielectric layers (e.g., ILD layers) may comprise silicon dioxide, fluorinated silicon glass (FGS), SILK (a product of Dow Chemical of Michigan), BLACK DIAMOND (a product of Applied Materials of Santa Clara, Calif.), and/or other suitable insulating materials. The MLI structure may be formed by suitable processes typical in CMOS fabrication such as CVD, PVD, ALD, plating, spin-on coating, and/or other processes.

The device substrate 134 accommodates the bioFET 110 and may be, for example, a semiconductor layer of a semiconductor-on-insulator (SOI) substrate or a bulk semiconductor substrate. The bioFET 110 comprises a pair of source/drain regions 114, 116 and, in some embodiments, a back gate electrode 148. The source/drain regions 114, 116 have a first doping type and are arranged within the device substrate 134, respectively on opposite sides of a channel region 120 of the bioFET 110. The channel region 120 has a second doping type opposite the first doping type and is arranged in the device substrate 134, laterally between the source/drain regions 114, 116. The first and second doping types may, for example, respectively be n-type and p-type, or vice versa. In some embodiments, the bioFET 110 is arranged through the device substrate 134 extending from a top surface of the device substrate 134 to a bottom surface of the device substrate 134 as shown. In some other embodiments, the source/drain regions 114, 116 and the channel region 120 are arranged at an underside of the device substrate 134 (lower portion of the device substrate 134). In some embodiments, the bioFET 110 is arranged within a well region 140 of the device substrate 134 that has the second doping type, and/or are electrically coupled to the BEOL interconnect structure 136. The back gate electrode 148 is arranged under the device substrate 134, laterally between the source/drain regions 114, 116, and is spaced from the device substrate 134 by a gate dielectric layer 142 of the bioFET 110. In some embodiments, the back gate electrode 148 is electrically coupled to the BEOL interconnect structure 136 and/or is metal, doped polysilicon, or a combination thereof.

An isolation layer 144 is arranged over the device substrate 134, and comprises a sensing well 146. The sensing well 146 extends into the isolation layer 144 to proximate the channel region 120 and is at least partially lined by a bio-sensing film 118. Further, in some embodiments, the sensing well 146 extends through the isolation layer 144 to expose the channel region 120 and/or is arranged laterally between the source/drain regions 114, 116. In some embodiments, the sensing well 146 and the lined bio-sensing film 118 laterally extend to cross boundaries of the channel region 120 and the source/drain regions 114, 116 to partially cover the source/drain regions 114, 116. The isolation layer 144 may be, for example, silicon dioxide, a buried oxide (BOX) layer of a SOI substrate, some other dielectric, or a combination thereof. The bio-sensing film 118 lines the sensing well 146 and, in some embodiments, covers the isolation layer 144. Though not shown in FIG. 3, in some other embodiments, the bio-sensing film 118 may have openings depending on applications, for example, for external wiring pads. Further, the bio-sensing film 118 is configured to react with or bind to biological entities to facilitate a change in the conductance of the channel region 120, such that the presence of the biological entities may be detected based on the conductance of the channel region 120. The bio-sensing film 118 may be, for example, titanium nitride, titanium, a high κ dielectric, some other material configured to react with or bind to the biological entities, or a combination thereof. The biological entities may be, for example, DNA, ribonucleic acid (RNA), drug molecules, enzymes, proteins, antibodies, antigens, or a combination thereof. The bio-sensing film 118 may include a material for any specified bio-molecule binding. In an embodiment, the bio-sensing film 118 includes a high-k dielectric material such as, $HfO_2$. In an embodiment, the bio-sensing film 118 includes a metal layer such as Pt, Au, Al, W, Cu, and/or other suitable metal. Other exemplary bio-sensing film 118 includes high-k dielectric films, metals, metal oxides, dielectrics, and/or other suitable materials. As a further example, the bio-sensing film 118 includes $HfO_2$, $Ta_2O_5$, Pt, Au, W, Ti, Al, Cu, oxides of such metals, $SiO_2$, $Si_3N_4$, $Al_2O_3$, $TiO_2$, TiN, SnO, $SnO_2$; and/or other suitable materials. The bio-sensing film 118 may include a plurality of layers of material. The bio-sensing film 118 may, for example, have a thickness of less than about 100 nanometers.

In some embodiments, the reference electrode 132 is disposed over the sensing well 146. In other embodiments, the reference electrode 132 may be positioned indirectly or directly on the isolation layer 144 laterally next to the sensing well 146. The reference electrode 132 may alternatively be disposed indirectly or directly under the bio-sensing film 118. In some embodiments, the reference electrode 132 comprises platinum (Pt), gold (Au), silver (Ag), silver chlorine (AgCl) or the combination thereof. The reference electrode 132 may have a thickness in a range of from about 500 Å to about 1 μm. By separating the reference electrode 132 from the device substrate 134, contamination introduced by the reference electrode 132 is effectively prevented.

While the embodiment of FIG. 3 includes the back gate electrode 148 and the gate dielectric layer 142, it is appreciated that the back gate electrode 148 and the gate dielectric layer 142 may be omitted in other embodiments. The sensing well 146 is exposed to a fluid 122. With the fluid 122 is applied to the bioFET device 130, a reference bias is applied to the reference electrode 132.

During operation, a test sample is suspended within the fluid 122 and applied to the sensing well 146 to detect the presence of the biological entities. Further, after application of the fluid 122 to the sensing well 146, the fluid 122 may be biased to a reference potential to enhance the detection of the biological entities. The reference electrode 132 provides the fluid 122 a reference potential, for example, through an external power source which may be controlled by the controller 108.

Figure 4:
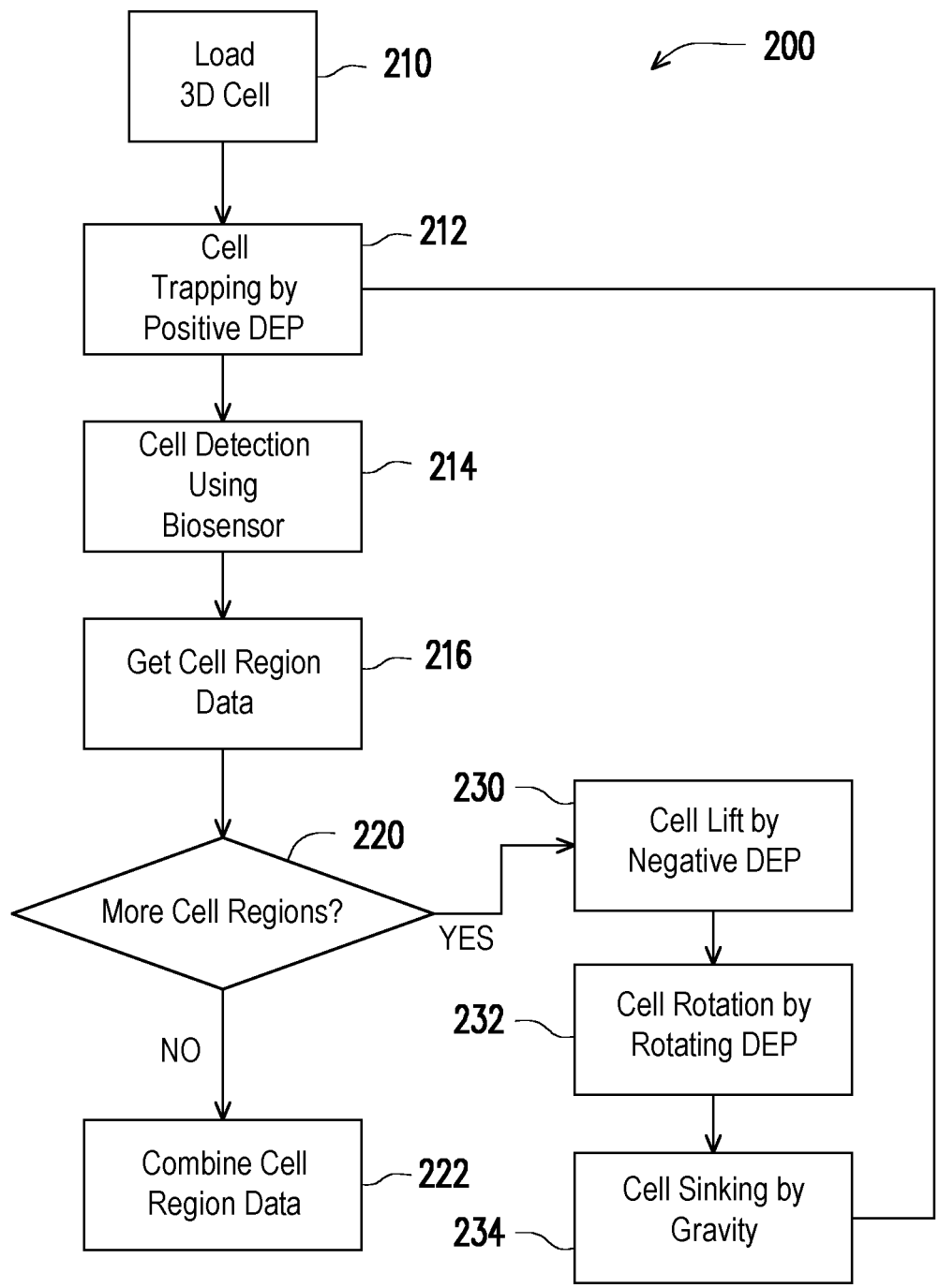
FIG. 4 is a flow diagram illustrating a method for 3D analysis of a test sample using a 2D biosensor device in accordance with some embodiments.
Figure 5A:
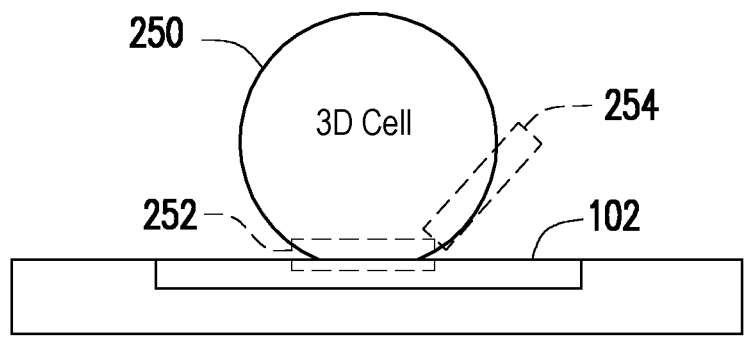
FIGS. 5A-5C are block diagrams illustrating aspects of the method shown in FIG. 4 in accordance with some embodiments.
Figure 5B:
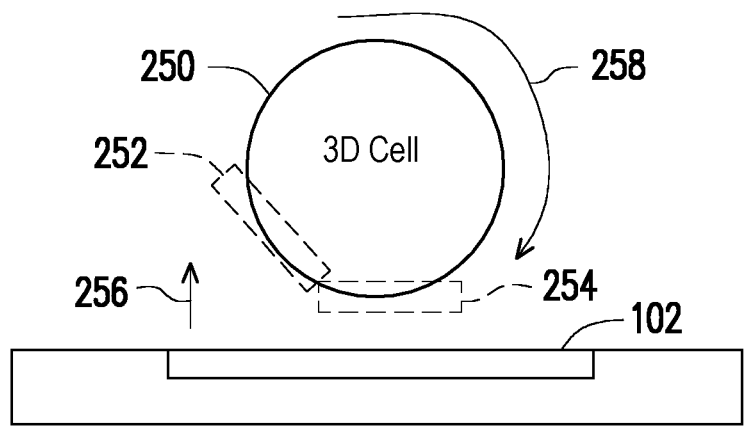
Figure 5C:
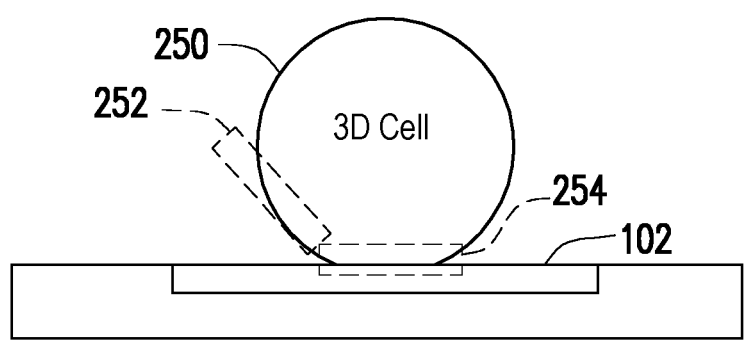

FIG. 4 is a flow diagram illustrating a method for 3D analysis of a test sample such as a cell or group of cells using a 2D biosensor array, and FIGS. 5A-5C conceptually illustrate further aspects of the method of FIG. 4. In general, the illustrated method includes repositioning of the 3D test sample relative to the biosensor array so a plurality of different regions of the sample sequentially are placed in contact with the sensor array for analysis. The data collected from each of the sample regions are then combined to obtain a 3D analysis of the test sample using a 2D sensor array. More particularly, the illustrated method 200 includes loading a test sample, such as a cell or group of cells into the biosensor device 130 at a step 210. At step 212, the cell is "trapped" or placed on the biosensor array 102. As noted above, the biosensor system 100 shown in FIG. 1 includes an electrode array 106 configured to selectively apply various DEP forces for manipulating the test sample relative to the sensor array 102. The controller 108 may be programmed or operated to apply the appropriate electrical signals to the electrode array 106 to generate the desired DEP force.

Thus, in step 212 the sample is trapped using a positive DEP force in some examples. In other embodiments, the sample contacts the sensor array 102 by gravity force. FIG. 5A illustrates a 3D test sample 250 that includes a cell or group of cells. A first region 252 of the sample or cell 250 contacts the sensor array 102. At step 214, analysis or detection of the test sample 250 is conducted by the biosensor 102 to obtain test data regarding the first cell region 252 at step 216.

As noted above, a plurality of regions of the test sample are analyzed and the data are combined to generate a 3D analysis of the sample. If there are additional regions of the test sample 250 for analysis as determined at step 220, the method proceeds to step 230. At step 230, the test sample 250 is lifted by a DEP force, such as a negative DEP force such that the first region 252 shown in FIG. 5A is lifted off the biosensor 102. FIG. 5B shows an arrow 256 representing the negative DEP that lifts the sample 250 off the biosensor 102. In step 232 the sample 250 is rotated by applying a rotating DEP force. As will be discussed further below, the controller 108 is operable to apply different electrical signals to the electrode array 106, such as a rotating AC signal to apply the desired rotational force to the sample 250. In FIG. 5B, the rotational force is represented by an arrow 258. The sample 250 is rotated until a second region 254 is positioned for placement on the biosensor array 102, as shown in FIG. 5B. In step 234 of FIG. 4, the sample 250 is allowed to sink from its elevated position such that the second region 254 of the sample 250 contacts the biosensor 102 as shown in FIG. 5C. The method 200 then returns to step 212, where a positive DEP is applied to trap the sample 250 on the biosensor 102. In some implementations, gravity force is sufficient to situate the test sample 250 on the biosensor 102 and step 212 may be omitted.

Once all of the test regions of the sample 250 have been analyzed as determined in step 220, the test data for each of the sample regions is combined in step 222 to produce a 3D analysis of the 3D sample cell.

Figure 6:
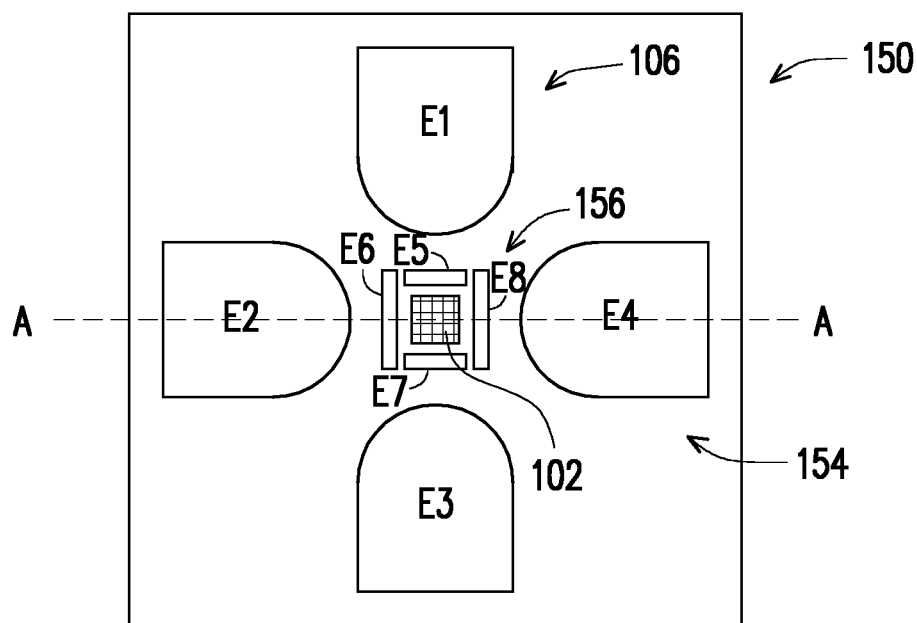
FIG. 6 is a top view illustrating aspects of an example biosensor device in accordance with some embodiments.

FIG. 6 is a top view illustrating aspects of the electrode array 106 and biosensor array 102 of the biosensor system 100. In the illustrated example the electrode array 106 includes two electrode groups or patterns. A first electrode group 154 includes electrodes E1, E2, E3 and E4 situated in a common plane on respective four sides of the biosensor array 102. A second electrode group 156 includes electrodes E5, E6, E7 and E8, which are also situated in a common plane on the respective four sides of the biosensor array 102. In the illustrated example, the first electrode group 154 is positioned outside the second electrode group 156, and both groups of electrodes 154, 156 are in the same plane. Other embodiments may employ more or fewer electrodes in the electrode array.

Figure 7:
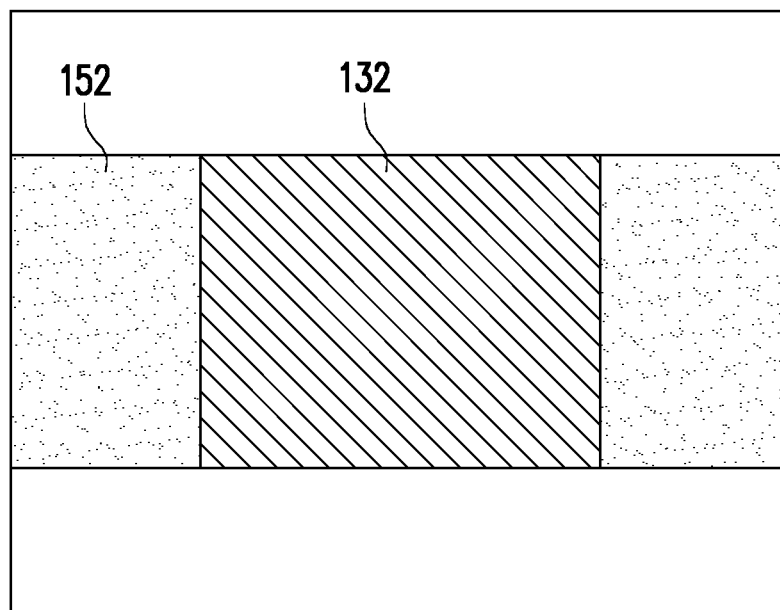
FIG. 7 is a top view illustrating further aspects of the example biosensor device shown in FIG. 6 in accordance with some embodiments.

FIG. 7 illustrates an example of further components of a biosensor device 150 that includes the biosensor array 102 and electrode array 106. FIG. 7 shows the reference electrode 132 of the bioFET device 130, which is configured to be situated over the sensor array 102 as will be discussed further below. A microfluidics cover 152 is configured to cover the reference electrode 132 and the sensor array 102. A microfluidics wall further encloses the sides of the device 150 to create a microfluidic channel that contains the fluid 122 and receives a test sample that is positioned relative to the sensor array 102 for analysis.

Figure 8:
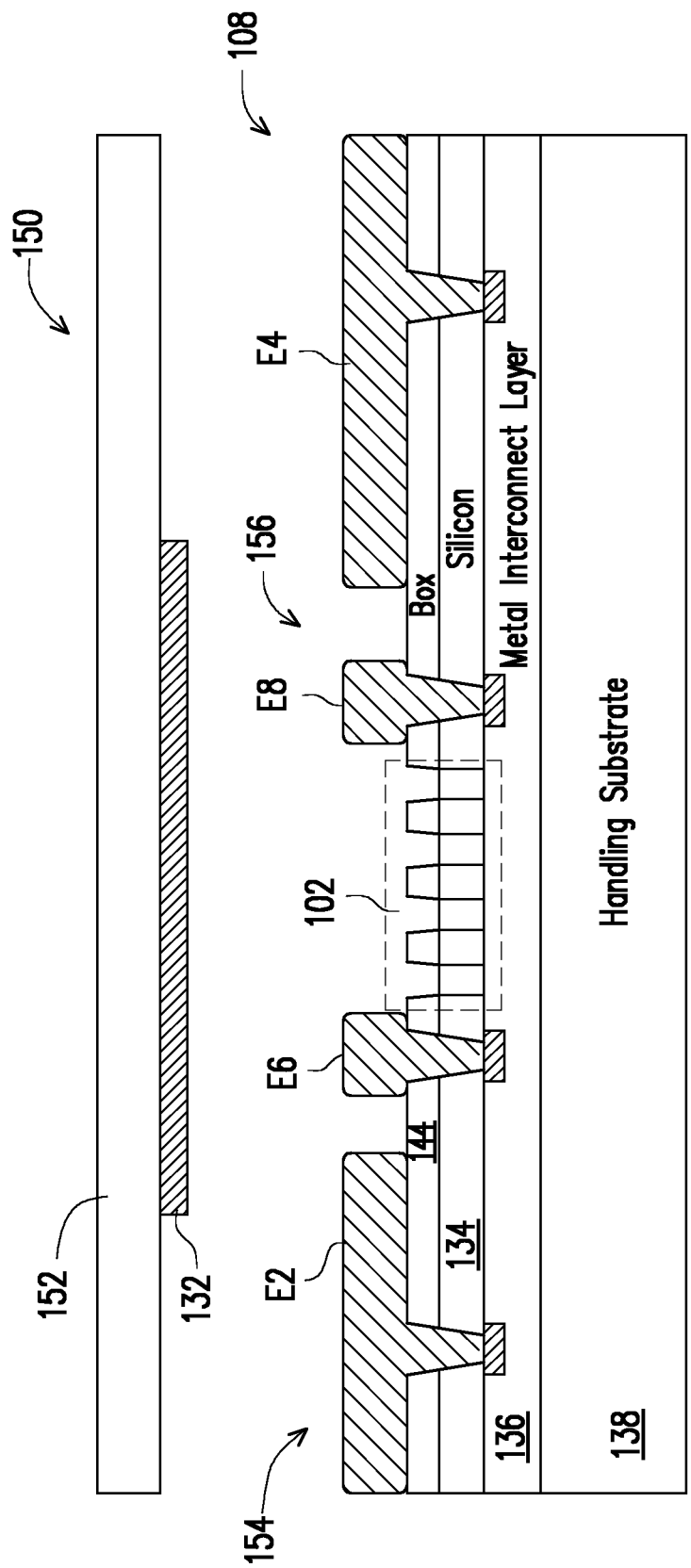
FIG. 8 is a sectional side view illustrating further aspects of the example biosensor device shown in FIGS. 6 and 7 in accordance with some embodiments.

FIG. 8 is a side section view of the biosensor device 150 taken along line A-A of FIG. 6, including the sensor array 102 and electrode array 106 of the backside sensing bioFET device 130 shown in FIG. 3 (not all details of the bioFET device 130 are shown in FIG. 8 for ease of discussion). The biosensor device 150 includes the interconnect structure 136 arranged over the handling substrate 138. In some examples the electrical interconnect structure provided in the interconnect layer 136 is metal, though other conduct materials may alternatively be used as noted hereinabove. The device substrate 134 is arranged over the interconnect structure 136. The handling substrate 138 may be, for example, a bulk semiconductor substrate, such as a bulk substrate of monocrystalline silicon and the substrate 134 may be, for example, a semiconductor layer of a semiconductor-on-insulator (SOI) substrate or a bulk semiconductor substrate.

The isolation or BOX layer 144 is arranged over the device substrate 134, and the reference electrode 132 is disposed over the biosensor array 102. FIG. 8 illustrates portions of the electrode array 106, including sectional views of the electrodes E2 and E4 of the first electrode group 154 and electrodes E6 and E8 of the second electrode group 156. The electrodes E6, E8, may be fabricated from any suitable conductive material such as gold, platinum, carbon, etc. In the illustrated embodiment, the electrodes of both the first and second electrode groups 154, 156 are formed over the isolation layer 144 and are coplanar with one another. The electrodes further extend through the isolation layer 144 and the device substrate 134 to the interconnect layer 136. The electrode array 106 is thus connectable to a voltage source as controlled by the controller 108 to apply various signals to the electrodes of the electrode array to manipulate a test sample such as described in conjunction with FIGS. 4 and 5A-5C.

Figure 9:
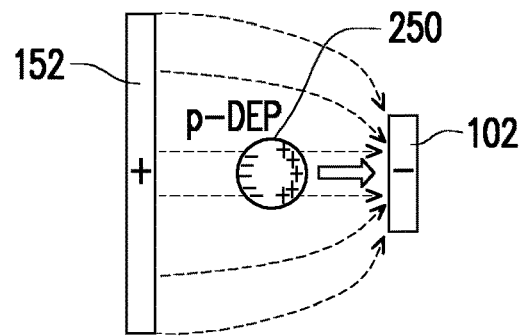
FIG. 9 is a block diagram conceptually illustrating a positive dielectrophoresis (DEP) force acting on a test sample in accordance with some embodiments.
Figure 10:
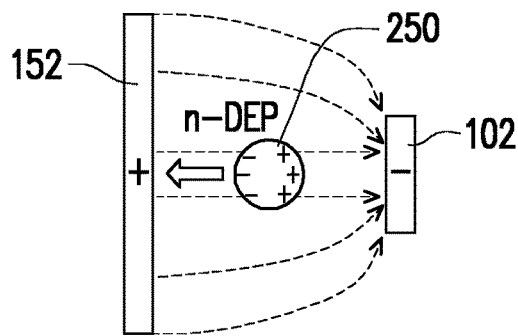
FIG. 10 is a block diagram conceptually illustrating a negative DEP force acting on a test sample in accordance with some embodiments.

In the illustrated example, the electrode array 106 are configured to selectively move a test sample 250 so as to trap the test sample 250 on the biosensor array 102, and to separate the test sample 250 from the biosensor array 102 by a DEP force. FIGS. 9 and 10 illustrate this concept, where a positive DEP is generated as shown in FIG. 9 to move the test sample 250 towards the biosensor array 102 and a negative DEP is generated in FIG. 10 to move the test sample 250 away from the biosensor array 102. More particularly, the test sample 250, such as a cell or group of cells, experiences a net force in the non-uniform electric field and is pushed towards the field maxima (positive DEP) in FIG. 9, or towards the field minimum (negative DEP) in FIG. 10.

Figure 11:
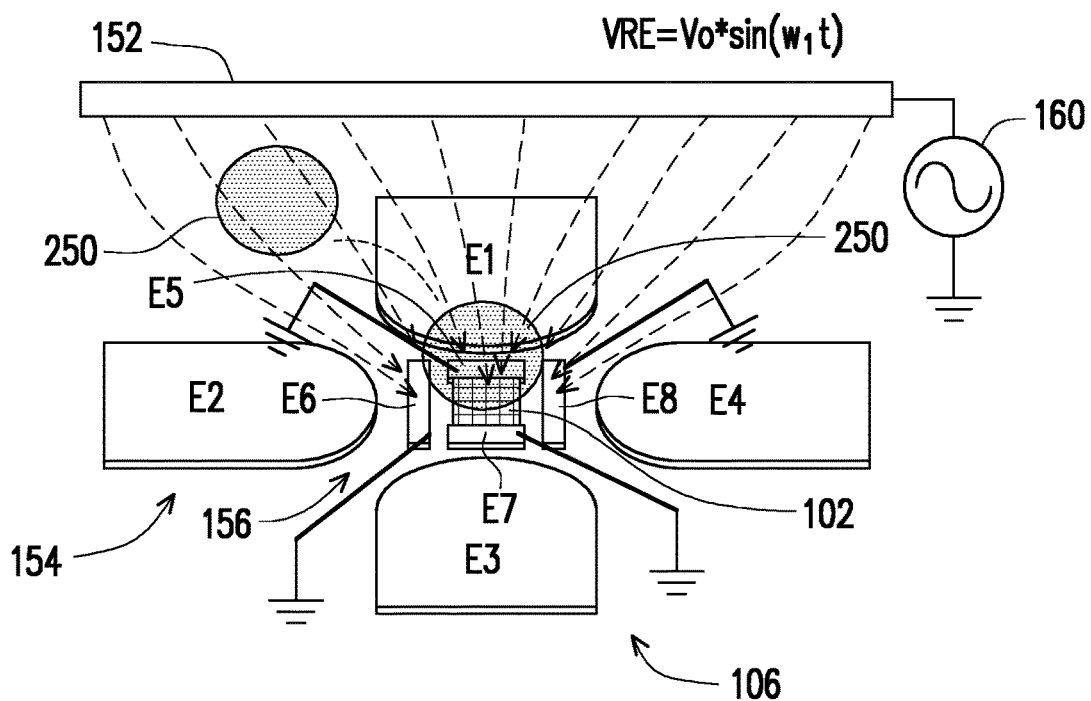
FIG. 11 is a block diagram illustrating an example of electrode activation to generate a DEP force in accordance with some embodiments.

The magnitude of the positive and negative DEP can be modified by the actuation frequency of the AC signal applied to the electrodes. Referring now to FIG. 11, the electrodes E5-E6 of the second or inner electrode group 156 are configured for generating the positive DEP for trapping the test sample 250 onto the biosensor array 102. The electrodes E1-E4 of the first electrode group 154 are floating, and each of the electrodes E5-E8 of the second or inner electrode group 156 are grounded. An actuation signal is applied from a voltage source 160 to the reference electrode 132 to generate the positive DEP. The controller 108 shown in FIG. 1 may be configured to control the voltage source 160. In the illustrated example, the reference electrode actuation signal VRE is determined according to $VRE = V_0 \ast \sin(w1t)$, where the AC signal frequency $w1$ is selected to achieve an efficient positive-DEP to push the test sample 250 towards the biosensor array 102 to trap the test sample 250 on the biosensor array 102.

Figure 12:
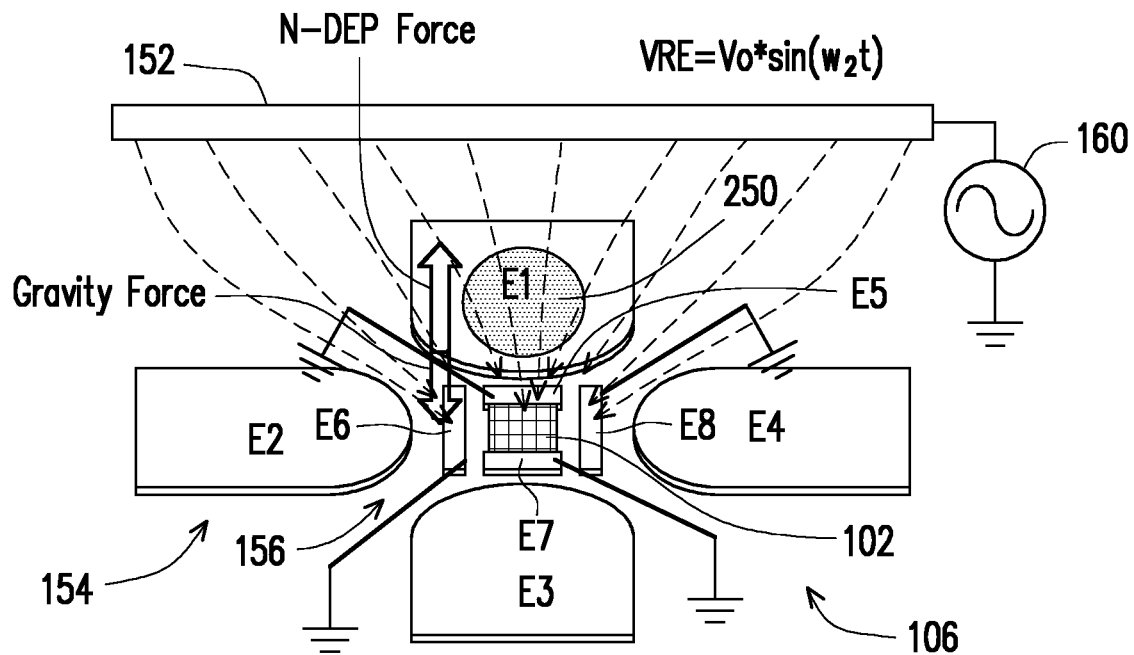
FIG. 12 is a block diagram illustrating another example of electrode activation to generate a DEP force in accordance with some embodiments.

FIG. 12 illustrates applying an actuation signal to generate the negative DEP to lift the test sample 250 off the biosensor array 102. The electrodes E5-E6 of the second or inner electrode group 156 are configured for generating the negative DEP lifting the test sample 250 off the biosensor array 102 against gravity. The electrodes E1-E4 of the first electrode group 154 are again left floating, and each of the electrodes E5-E8 of the second or inner electrode group 156 are grounded. An actuation signal is applied from the voltage source 160 to the reference electrode 132 to generate the negative DEP. In the illustrated example, the reference electrode actuation signal VRE is determined according to VRE=Vo*sin(w2t), where the AC signal frequency w2 is selected to achieve an efficient negative DEP to lift the test sample 250 against gravity.

Figure 13:
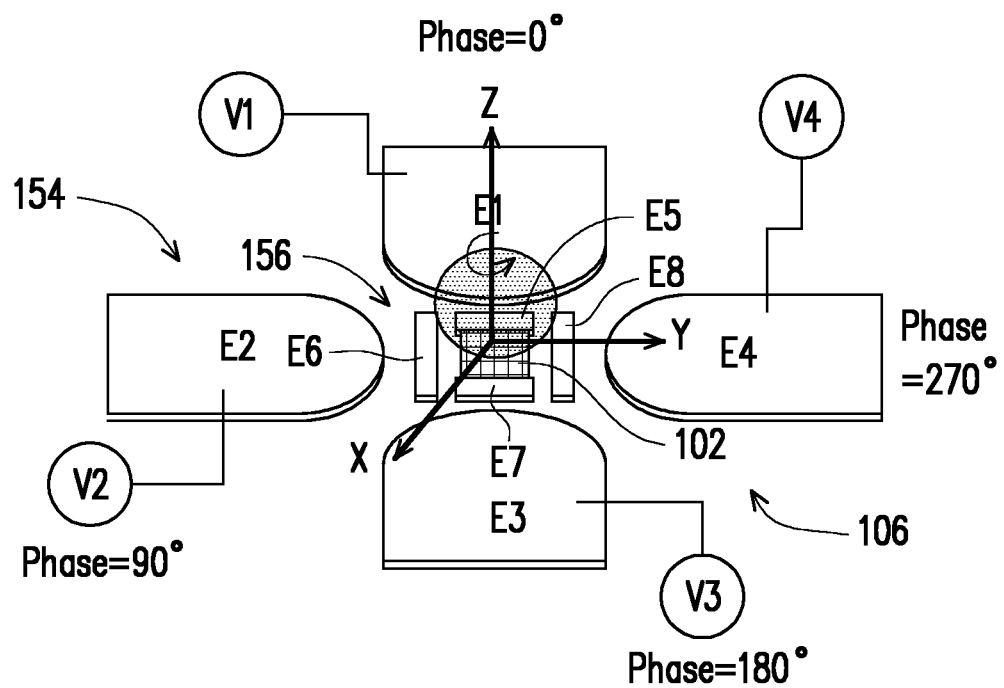
FIG. 13 is a block diagram illustrating another example of electrode activation to generate a DEP force in accordance with some embodiments.
Figure 14:
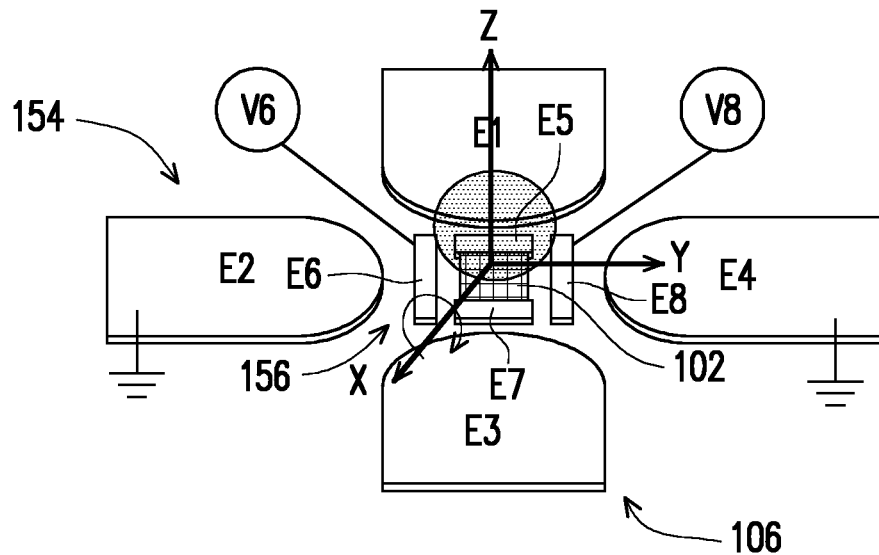
FIG. 14 is a block diagram illustrating another example of electrode activation to generate a DEP force in accordance with some embodiments.
Figure 15:
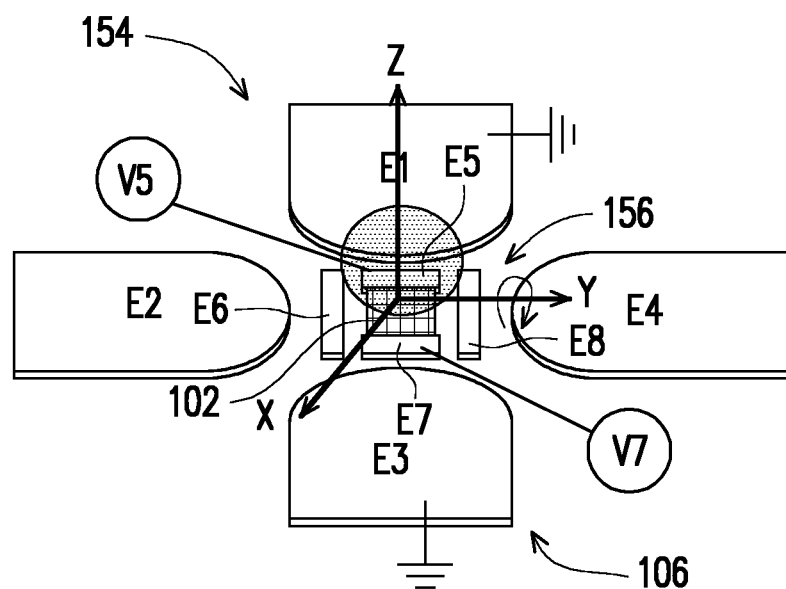
FIG. 15 is a block diagram illustrating another example of electrode activation to generate a DEP force in accordance with some embodiments.

Additionally, the illustrated electrode array 106 (see FIG. 1) are configured to selectively rotate the test sample to align the desired portion of the test sample with the biosensor array 102 as discussed above. For instance, the illustrated electrode array 106 are energized by the controller 108 to rotate the test sample about at least one of a first axis, a second axis extending perpendicularly to the first axis, or a third axis extending perpendicularly to the first axis and the second axis. FIGS. 13-15 illustrate example arrangements for rotating the test sample 250 about these three axes. For instance, FIGS. 13-15 illustrate X, Y and Z axes, with the X axis extending horizontally in and out of the drawing Figures, the Y axis extending perpendicularly to the X axis in a left-right direction, and the Z axis extending perpendicularly to both the X and Y axes in an up-down direction.

FIG. 13 illustrates an example where the electrode array 106 are configured, and actuation signals are applied, to rotate the test sample 250 about the Z axis. In other words, the test sample is rotated about a vertical axis after being lifted off the biosensor array 102 by the negative DEP force as shown in FIG. 12. In the example of FIG. 13, the electrodes E1, E2, E3 and E4 surround the biosensor array 102 and as such are positioned on each of four sides of the biosensor array 102. Thus, as shown in FIG. 13, the electrodes E1, E2, E3 and E4 are each separated from their adjacent electrodes by 90 degrees. In other words, the E1 electrode has a phase angle of 0, the E2 electrode has a phase angle of 90 degrees, the E3 electrode has a phase angle of 180 degrees, and the E4 electrode has a phase angle of 270 degrees.

To energize the electrodes to move the test sample 250 about the Z axis, the inner electrode group 156 are not used, and thus the electrodes E5-E8 and the reference electrode 132 are all Floating. The controller 108 is configured to apply voltages V1, V2, V3 and V4 to the electrodes E1, E2, E3 and E4, respectively, where the voltages V1-V4 are determined according to $$V1=Vo*\sin(wt)$$

$$V2=Vo*\sin(wt+0.5\pi)$$

$$V3=Vo*\sin(wt+\pi)$$

$$V4=Vo*\sin(wt+1.5\pi)$$

The AC signal frequency ω is determined based on the type of test sample and the microfluidics fluid solution. In some embodiments, the AC signal frequency is 10 k-50 MHz, for example.

FIG. 14 illustrates an example where the electrode array 106 are configured, and actuation signals are applied, to rotate the test sample 250 about the X axis after being lifted off the biosensor array 102 by the negative DEP force as shown in FIG. 12. In the example of FIG. 14, the electrodes E1, E3, E5, and E7, as well as the reference electrode 132 are not used and are thus floating. The electrodes E2 and E4 are grounded. Voltages V6 and V8 are applied to the electrodes E6 and E8, respectively. The voltage signals V6 and V8 are determined according to $$V6=Vo*\sin(wt)$$

$$V8=Vo*\sin(wt+\theta),$$

Where θ is about 40-90 degrees depending on the particular electrode shape and design.

FIG. 15 illustrates an example where the electrode array 106 are configured, and actuation signals are applied, to rotate the test sample 250 about the Y axis after being lifted off the biosensor array 102 by the negative DEP force as shown in FIG. 12. In the example of FIG. 15, the electrodes E2, E4, E6, and E8, as well as the reference electrode 132 are not used and are thus floating. The electrodes E1 and E3 are grounded. Voltages V5 and V7 are applied to the electrodes E5 and E7, respectively. The voltage signals V5 and V7 are determined according to $$V5=Vo*\sin(wt)$$

$$V7=Vo*\sin(wt+\theta),$$

Where θ is about 40-90 degrees depending on the particular electrode shape and design.

Figure 16:
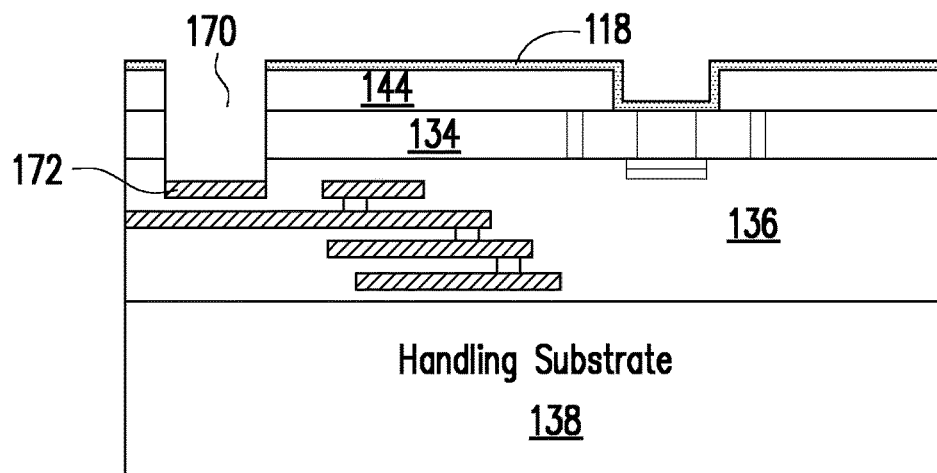
FIGS. 16-20 illustrate an example of a process for forming electrodes for the biosensor device shown in FIGS. 6-8 in accordance with some embodiments.

FIGS. 16-20 illustrate steps in a process for forming the electrode array 106 of the biosensor device 150. The electrode array 106 are formed on the isolation layer 144 to surround the biosensor array 102 in some examples. FIGS. 16-20 illustrate the formation of one of the electrode array 106 as an example. The remaining electrodes are fabricated similarly. In FIG. 16, the bioFET array 102 including an array of the dual-gate backside bioFET devices 130 illustrated in FIG. 3 is provided. As disclosed above, the structure includes the interconnect structure 136 arranged over the handling substrate 138, with the device substrate 134 arranged over the interconnect structure 136. The handling substrate 138 may be, for example, a bulk semiconductor substrate, such as a bulk substrate of monocrystalline silicon. The device substrate 134 accommodates the biosensor array 102 and may be, for example, a semiconductor layer of a semiconductor-on-insulator (SOI) substrate or a bulk semiconductor substrate. The isolation or BOX layer 144 is arranged over the device substrate 134 with the sensing film 118 disposed on the device substrate 134. In the illustrated examples, the electrode array 106 connect to other structures such as the controller 108 and various voltage sources through the interconnect layer 136. In FIG. 16, an opening 170 extends through the sensing film 118, the isolation layer 144 and the device substrate 134 to a conductive pad 172 in the interconnect layer 136.

Figure 17:
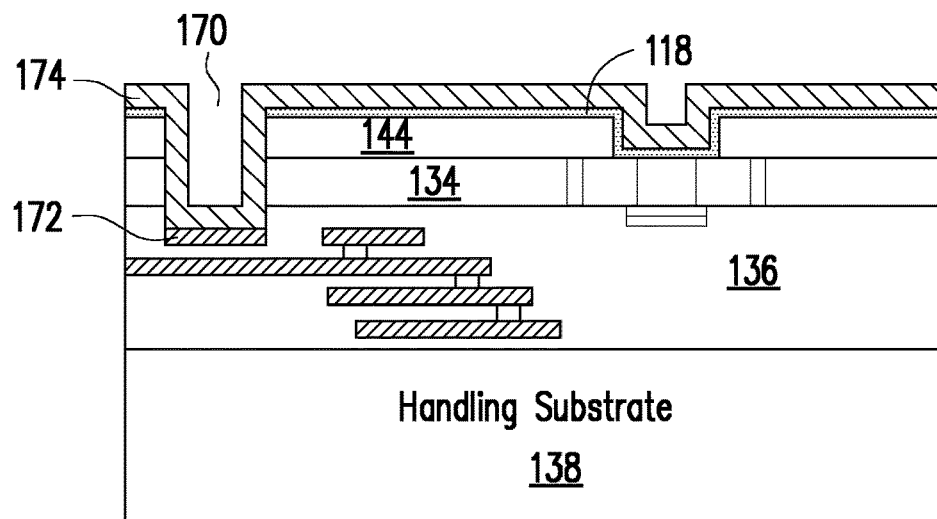
Figure 18:
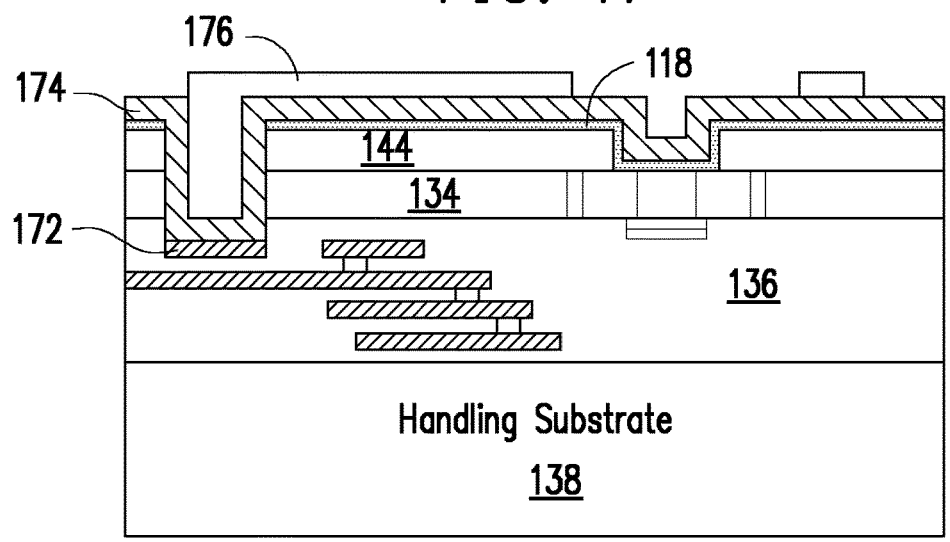

As shown in FIG. 17, a metal layer 174 is deposited over the sensing film 118, for example, by a metal sputtering process. The conductive layer lines the opening 170, and may include metal materials such as platinum (Pt), gold (Au), silver (Ag), silver chlorine (AgCl) or the combination thereof. In FIG. 18, a photoresist (PR) mask 176 is deposited over the conductive layer 174 and patterned. The PR mask is patterned to be an etch mask to etch the metal layer 170. A typical lithographic process may be used to deposit the PR mask, cure the photoresist, expose the photoresist to patterned light, and develop the photoresist to create a desired pattern.

Figure 19:
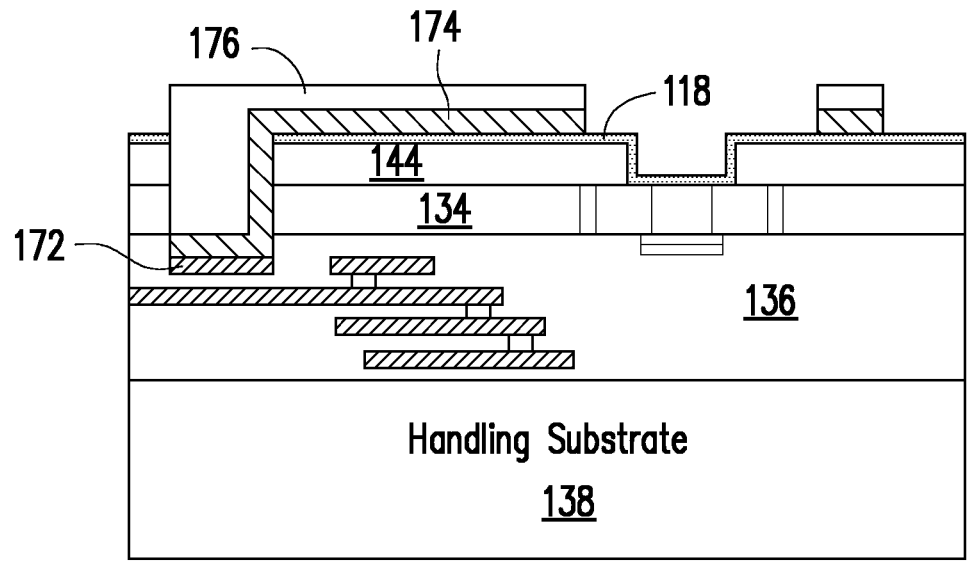
Figure 20:
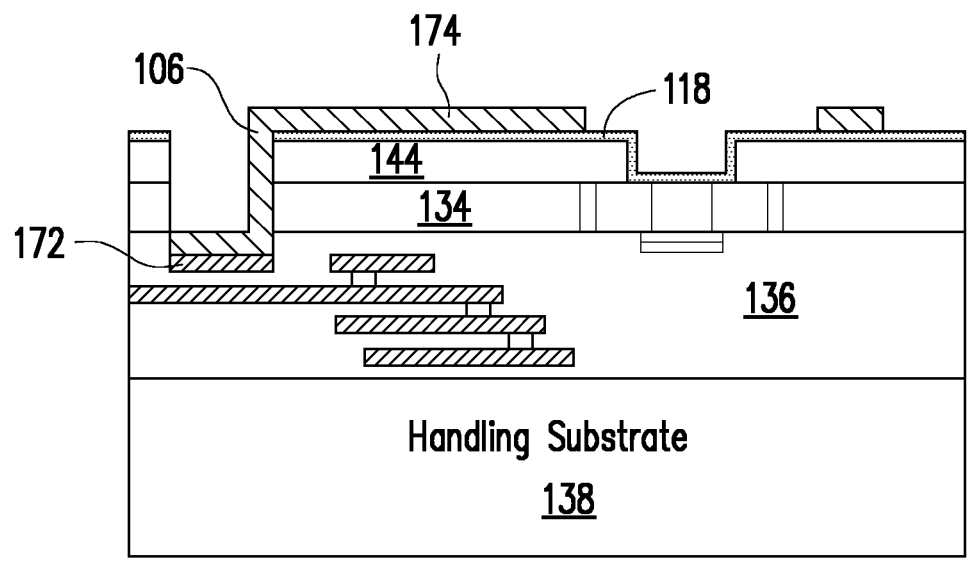

In FIG. 19, an etch process removes portions of the metal layer 174 in accordance with the PR mask 176. The etch process may be a dry etch. The dry etch may use a chlorine based or a fluorine based etchant in a plasma process. In one embodiment, the etch process utilizes an end point system where the etch process detects an end point material, for example, IMD material, and signals that the end point for the etch has been reached. At the end point, the etch process continues for a defined duration to over etch an additional amount of material to ensure complete removal of conductive material of the metal layer 174. In FIG. 20, the PR mask 176 is removed to expose the formed electrode pattern 106.

Disclosed examples thus provide biosensor systems and methods that gather data for a 3D analysis of a 3D test sample, such as a cell culture. Such 3D analysis may provide additional, more relevant information regarding the test sample. An array of 2D biosensors is able to gather 3D information regarding a 3D test sample by repositioning the test sample relative to the biosensor to gather data on several segments of the test sample. These data are then combined to provide the 3D analysis.

In accordance with some disclosed embodiments, a biosensor system includes an array of biosensors with a plurality of electrodes situated proximate the biosensor. A controller is configured to selectively energize the plurality of electrodes to generate a DEP force to selectively position a test sample relative to the array of biosensors.

In accordance with further embodiments, a biosensor system includes a handling substrate, an interconnect layer over the handling substrate, and a device substrate over the interconnect layer. The device substrate has a biosensor array electrically connected to the interconnect layer. An isolation layer is over the device substrate. A plurality of electrodes are formed over the isolation layer and extend through the isolation layer and the device substrate to the interconnect layer. The plurality of electrodes are configured to receive an AC signal to establish a DEP force to selectively position a test sample relative to the biosensor array.

In accordance with still further examples, a method includes providing a biosensor array and a 3D test sample. Data regarding a first segment of the 3D test sample is collected by the biosensor array. A DEP force is generated to reposition the 3D test sample relative to the biosensor array, and data regarding a second segment of the 3D test sample is collected by the biosensor array. The data regarding the first and second segments of the 3D test sample are then combined.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A biosensor system, comprising:
   a handling substrate;
   an interconnect layer over the handling substrate;
   a device substrate over the interconnect layer, the device substrate including a biosensor array electrically connected to the interconnect layer;
   an isolation layer over the device substrate; and
   a plurality of electrodes formed over the isolation layer and extending through the isolation layer and the device substrate to the interconnect layer, the plurality of electrodes configured to receive an AC signal to establish a DEP force to selectively position a test sample relative to the biosensor array;
   wherein the plurality of electrodes include:
   first, second, third and fourth electrodes positioned on respective first, second, third and fourth sides of the biosensor array; and
   fifth, sixth, seventh and eighth electrodes positioned on the respective first, second, third and fourth sides of the biosensor array.

2. The biosensor system of claim 1, wherein the plurality of electrodes include:
   a reference electrode positioned above the first, second, third, fourth, fifth, sixth, seventh and eighth electrodes, and the biosensor array.

3. The biosensor system of claim 2, wherein the AC signal includes a first AC signal having a first predetermined frequency and a second AC signal having a second predetermined frequency, wherein the reference electrode is configured to receive the first AC signal to establish a positive DEP to trap the test sample on the biosensor array, and the reference electrode is configured to receive the second AC signal to establish a negative DEP to separate the test sample from the biosensor array.

4. The biosensor system of claim 2, wherein the AC signal includes a first AC signal having a 0 degree phase angle, a second AC signal having a 90 degree phase angle, a third AC signal having a 180 degree phase angle, and a fourth AC signal having a 270 degree phase angle, and wherein the first electrode is configured to receive the first AC signal, the second electrode is configured to receive the second AC signal, the third electrode is configured to receive the third AC signal, and the fourth electrode is configured to receive the fourth AC signal to establish a DEP force to rotate the test sample about a first axis.

5. The biosensor system of claim 4, wherein the AC signal has a predetermined frequency.

6. The biosensor system of claim 4, wherein the sixth electrode is configured to receive a fifth AC signal having a first phase angle, and the eighth electrode is configured to receive a sixth AC signal having a second phase angle to establish a DEP force to rotate the test sample about a second axis perpendicular to the first axis.

7. The biosensor system of claim 1, wherein the biosensor array includes a plurality of backside sensing bioFETs.

8. A biosensor system, comprising:
   a handling substrate;
   an interconnect layer over the handling substrate;
   a device substrate over the interconnect layer, the device substrate including a biosensor array electrically connected to the interconnect layer;
   an isolation layer over the device substrate; and
   a plurality of electrodes formed over the isolation layer and extending through the isolation layer and the device substrate to the interconnect layer, the plurality of electrodes being positioned on four sides of the biosensor array;
   wherein the plurality of electrodes include:
   first, second, third and fourth electrodes positioned on a common plane on respective first, second, third and fourth sides of the biosensor array;
   fifth, sixth, seventh and eighth electrodes positioned on the common plane on the respective first, second, third and fourth sides of the biosensor array;
   a reference electrode positioned above the plurality of electrodes and the biosensor array; and a controller configured to selectively energize the plurality of electrodes to generate a DEP force to selectively position a test sample relative to the biosensor array.

9. The biosensor system of claim 8, wherein the plurality of electrodes are configured to receive a first AC signal having a first predetermined frequency and a second AC signal having a second predetermined frequency to establish the DEP force to selectively position the test sample relative to the biosensor array.

10. The biosensor system of claim 9, wherein the reference electrode is configured to receive the first AC signal to establish a positive DEP to trap the test sample on the biosensor array, and the reference electrode is configured to receive the second AC signal to establish a negative DEP to separate the test sample form the biosensor array.

11. The biosensor system of claim 8, wherein the biosensor array includes a plurality of backside sensing bioFETs.

12. The biosensor system of claim 8, wherein the plurality of electrodes are configured to receive a first AC signal have a 0 degree phase angle, a second AC signal having a 90 degree phase angle, a third AC signal having a 180 degree phase angle, and fourth AC signal having a 270 degree phase angle, and wherein the first electrode is configured to receive the first AC signal, the second electrode is configured to receive the second AC signal, the third electrode is configured to receive the third AC signal, and the fourth electrode is configured to receive the fourth AC signal to establish a DEP force to rotate a test sample about a first axis.

13. A method, comprising:
providing a handling substrate;
providing an interconnect layer over the handling substrate,
providing a device substrate over the interconnect layer, the device substrate including a biosensor array electrically connected to the interconnect layer;
providing an isolation layer over the device substrate;
providing a plurality of electrodes formed over the isolation layer and extending through the isolation layer and the device substrate to the interconnect layer, the plurality of electrodes configured to receive an AC signal to establish a DEP force to selectively position a three-dimensional (3D) test sample relative to the biosensor array, wherein the plurality of electrodes include:
first, second, third and fourth electrodes positioned on respective first, second, third and fourth sides of the biosensor array; and
fifth, sixth, seventh and eighth electrodes positioned on the respective first, second, third and fourth sides of the biosensor array;
providing the 3D test sample;
collecting data regarding a first segment of the 3D test sample by the biosensor array;
generating the DEP force to reposition the 3D sample relative to the biosensor array, including applying the AC signal to the first, second, third, fourth, fifth, sixth, seventh and eighth electrodes, and to a reference electrode positioned above the first, second, third, fourth, fifth, sixth, seventh and eighth electrodes and the biosensor array;
collecting data regarding a second segment of the 3D test sample by the biosensor array; and
combining the data regarding the first and second segments of the 3D test sample.

14. The method of claim 13, wherein generating the DEP force includes generating a positive DEP force to trap the 3D test sample on the biosensor array.

15. The method of claim 13, wherein generating the DEP force includes generating a negative DEP force to lift the 3D test sample off the biosensor array.

16. The method of claim 13, wherein generating the DEP force includes generating a rotating DEP force to rotate the 3D test sample about a predetermined axis.

17. The method of claim 13, wherein generating the DEP force includes generating a rotating DEP force to rotate the 3D test sample about at least one of a first axis, a second axis extending perpendicularly to the first axis, or a third axis extending perpendicularly to the first axis and the second axis.

18. The method of claim 13, wherein generating the DEP force includes selectively energizing the first, second, third, fourth, fifth, sixth, seventh and eighth electrodes positioned proximate the biosensor array.

19. The method of claim 18, wherein selectively energizing the plurality of electrodes includes applying a predetermined AC signal to at least one of the first, second, third, fourth, fifth, sixth, seventh and eighth electrodes.

20. The method of claim 19, wherein the predetermined AC signal has a predetermined frequency.

* * * * *